United States Patent [19]

Garth

[11] Patent Number: 5,028,066
[45] Date of Patent: Jul. 2, 1991

[54] STEPWISE CONVERTIBLE TRICYCLE TOY

[76] Inventor: George V. Garth, 99 Woodshire North, Getzville, N.Y. 14068

[21] Appl. No.: 189,378

[22] Filed: May 2, 1988

[51] Int. Cl.[5] ........................ B62B 1/04; B62B 7/00; B62K 9/00; B62K 19/30
[52] U.S. Cl. ..................................... 280/282; 280/30; 280/47.11; 280/293; 280/47.371
[58] Field of Search ................. 280/282, 287, 295, 30, 280/202, 293, 47.11, 47.37, 7.15, 289 H

[56] References Cited

U.S. PATENT DOCUMENTS

| | | | |
|---|---|---|---|
| 1,218,943 | 3/1917 | Hudry | 280/30 X |
| 2,976,912 | 3/1961 | Dias | 280/30 X |
| 3,079,162 | 2/1963 | Michels, Jr. | 280/30 X |
| 3,485,507 | 12/1969 | Christof | 280/30 |
| 3,550,998 | 12/1970 | Boudreau et al. | 280/47.38 |
| 3,595,599 | 7/1971 | Black | 280/282 |
| 3,816,873 | 6/1974 | Thorud et al. | 280/47.37 R X |
| 4,730,840 | 3/1988 | Goldmeier | 280/293 X |
| 4,832,354 | 5/1989 | LaFreniere | 280/30 |

FOREIGN PATENT DOCUMENTS

| | | | |
|---|---|---|---|
| 2924798 | 1/1981 | Fed. Rep. of Germany | 280/293 |
| 2512767 | 3/1983 | France | 280/293 |
| 1272304 | 4/1972 | United Kingdom | 280/30 |

*Primary Examiner*—Mitchell J. Hill
*Attorney, Agent, or Firm*—Harold J. Greenwald

[57] ABSTRACT

This is a baby toy which matures with the baby from infancy through childhood, accelerating and enhancing baby's mental and physical development, encouraging fitness, and helping baby develop coordination skills at an earlier age. The toy is an enhanced tricycle with stepwise removable parts, which comprise one or more of the following: push and guide handle, foot rest, back support, seat belt, left and right restrainers with or without spacers which allow adjustment of a snap-in front restrainer, the side restrainers also preventing the handlebars from being rotated by the occupant, child proof parking brake to allow the tricycle to be safely stored or parked, and a sun shade. The push and guide handle allows pushing while walking behind the toy vehicle, guiding and controlling the direction of toy's travel, while allowing the occupant child to participate in the propulsion and guidance processes as soon as the child is ready. The push and guide handle will also allow the person supervising the child to help the child develop braking skills—a skill which is not normally developed with conventional tricycles, and which makes the conventional tricycles unsafe. The collapsible handle will allow the toy to fit into the trunk of a car and be adjusted to convenient operating positions for persons of various heights. The stepwise convertible tricycle toy is capable of shipment in knocked down form in a compact container for quick and easy assembly by non-skilled, non-technical persons using only the basic tools.

19 Claims, 3 Drawing Sheets

STEPWISE CONVERTIBLE TRICYCLE TOY

BACKGROUND

1. Field of Invention

This invention relates to stepwise convertible tricycle toy vehicle which allows controlled and gradual introduction of an infant to a self propelled, self guided mode of operation. The toy is useful as a passive means of conveyance of the infant occupant from the time the infant can hold his or her head upright, and as the infant grows, the toy is converted to challenge the infant to participate in its propulsion, guidance, and then its braking processes. Eventually, from a passive occupant, the infant becomes an equal partner and, finally, the sole safe driver of this toy vehicle.

2. Description of Prior Act

In today's faster moving society there exists a desire to accelerate and enhance the various stages of child development, both mentally and physically. It is desirable to do so safely in a controlled manner. Many toys which provide mental stimulation and challenge children's mental capacities have been developed. However, it appears that toys which challenge the child to develop coordination skills and gain control of the motor actions at an earlier age are lacking. Vehicles used to transport infants are of passive type and the infant is not challenged to participate in the propulsion or guidance thereof. Tricycles and pedal cars become useful only after the infant fully develops coordination skills and adequate size and strength to allow infant's feet to reach the pedals and propel the vehicles.

Thus, the existing vehicles are either propelled and guided by others while the infant is compelled to remain a passive occupant, or are of the type which require full development of mental and physical capacities to become an active independent and unassisted driver thereof.

In most cases, the abrupt transition process from a passive occupant to an unassisted driver takes place with a minimum of training. The child, anxious to use the new self propelled toy, is concentrating on making it go. The parents rejoice in the child's progress and forget to teach the child how to stop the vehicle. Articles have been written in toy magazines describing tricycles as unsafe toys lacking a braking mechanism. Such is not the case. It is not the lack of a braking mechanism which results in accidents when children fail to bring the tricycle to a stop, it is the lack of training in the use of the built in braking mechanism. The braking mechanism is the reversal of the rotation of the pedals, which stops the front wheel, thereby effectively stopping the tricycle. Most children, and many parents interviewed, are not even aware of this most important safety feature because no one has trained them when they were abruptly transferred from a parent propelled vehicle to the tricycle.

The stepwise convertible tricycle toy will overcome the unsafe operation of the conventional tricycles—the child's inability to stop the forward motion of the tricycle with a braking mechanism due to lack of proper instruction. With the stepwise convertible tricycle toy, the child will learn to turn the pedals in backwards direction when the supervising person switches the direction of travel from forward to backward by using the push and guide handle. This will teach the child how to use the built-in braking mechanism of turning the pedals backwards, a skill which is not developed with conventional tricycles.

In addition to the proper training to use the braking mechanism described above, the stepwise convertible tricycle toy can be equipped with a child proof parking brake means attached to the rear axle assembly means, allowing the parking of the stepwise convertible tricycle toy on an inclined surface, with the child safely held by a seat belt and the restraining means, and also allowing parking or storage of the stepwise convertible tricycle toy with the child proof parking brake which will prevent the child from using the toy unsupervised.

The existing vehicles are of time limited use because children outgrow the passive vehicle at about 20 months of age, and it becomes necessary to acquire the self propelled vehicle which puts a burden on families of limited means, and with limited storage space, to purchase and accommodate the multiple vehicles. This need, however, has been addressed to some degree by attempts to devise combination vehicles none of which have been commercially successful due to their complexity.

Therefore, a need has existed to provide a vehicle which will allow the infant to gradually become a participant in the propulsion and guidance processes which, under lesser and lesser degree of control, results in accelerated and enhanced development of mental and physical skills. Instead of an abrupt transfer from a fully controlled to a fully independent self propelled, self guided vehicle, which is frightening to both the infant and the parents, who for safety's sake may be delaying the transfer, this invention provides a means of gradual safe stepwise reduction of control, as each child develops at his or her own pace without endangering the child by allowing fully independent control of a vehicle, and without restricting and delaying the transition process. As each step is taken in the process described below, it can be reversed without subjecting the child to danger if the child was not ready for it. All tricycle enhancements which form the whole of this invention can be detached or attached by unskilled persons using only the basic tools.

OBJECTS AND ADVANTAGES

It is the primary object of the present invention to provide a novel toy vehicle which is stepwise convertible and enhances, encourages and accelerates the gradual development of infants' mental and physical skills into childhood.

Another object of this invention is to provide a novel toy vehicle which will allow enhancement and acceleration of the child's development under close supervision.

Still another object of this invention is to provide a novel infant's toy vehicle which will provide for controlled gradual and safe active participation by the occupant in the propulsion process.

Yet another object of this invention is to provide a novel infant's toy vehicle which will allow controlled gradual safe, and active participation by the occupant in the steering and guidance process.

Still another object of this invention is to provide a novel toy vehicle which will develop a child's skill in using the built-in, child activated braking mechanism, thus overcoming the single most unsafe feature of the conventional tricycle.

Yet another object of this invention is to provide a novel toy vehicle which will allow a child to propel it only as long as the child wants to do so, and then allow the supervising person to continue propelling the vehicle, pushing and guiding it, while in upright position, thereby eliminating the need to carry both the infant and the toy vehicle, if the infant tires.

Still another object of this invention is to provide a novel vehicle which is equipped with a conveniently located child proof parking brake, which can be simply and reliably operated by an adult person to allow parking of the vehicle in a safe, locked mode, or on inclined surfaces.

Yet another object of this invention is to provide a novel infant's toy vehicle which is easily storable in limited space (such as the trunk of a car) and easily restorable to its operating configuration.

Still another object of this invention is to provide a novel infant's vehicle which is adjustable for the various heights of the persons pushing and guiding the vehicle in an upright position.

Yet another object of this invention is to provide a novel toy vehicle for those who may not be able to afford a multiplicity of vehicles due to storage space or budget limitations, with this one vehicle serving the transportation, and later skill development, and finally, the amusement needs as the infant develops.

Yet another object of this invention is to provide a novel toy vehicle which is capable of being shipped in knocked down form in a compact container.

Still another object of this invention is to provide a novel toy vehicle which can easily be assembled by non-technically oriented, unskilled persons using only the basic tools.

These and other objects have been achieved, according to this invention, and will become apparent from the disclosure, the drawings and the claims that follow.

Readers will find further objects and advantages of this invention from a consideration of the ensuing description and accompanying drawings.

BRIEF DESCRIPTION OF THE DRAWINGS

The novel features of the stepwise convertible tricycle toy are set forth in the drawings. The following drawings and the description further shows the advantages and the objects, and the manner of operation of this invention.

DRAWING REFERENCE NUMERALS

10—Push and Guide Handle Means
12—Detachable Back Support Means
14—Detachable Foot Rest Means
16—Detachable Safety Seat Belt Means
18—Detachable Left Restrainer Means
20—Spacer Means
22—Detachable Front Restrainer Means
24—Detachable Right Restrainer Means
26—Child Proof Parking Brake Means
28—Removable Sun Shade Canopy Means
30—Transverse Rear Axle Assembly Stepplate or Rear Deck
32—Rotatable Rear Wheel Assembly
34—Longitudinal Main Frame Assembly
36—Front Fork Stem
38—Rotatable Front Wheel Assembly
40—Front Fork
42—Pedal
44—Fender
46—Cylindrical Steering Sleeve
48—Up and Down Adjustable Steering Handlebar
50—Saddle Seat
52—Adjustable Saddle Support Means
54—Bolt or Other Attachment Means
56—Set Screw
60—Upper, Smaller Diameter, "U" Shaped Telescoping Style Handle
62—Lower, Larger Diameter, Handle Members
64—Catch
66—Lower, Inverted "U" Shaped, Handle Member
68—Multiple Holes
70—Upper, Inverted "U" Shaped, Handle Member
72—Wing Nut
74—Upper, Smaller Diameter, "T" Shaped, Handle Member
76—Lower, Larger Diameter, Handle Member
78—Ball Bearing Catch Mechanism
80—Upper, Tubular, Inverted "L" Shaped, Handle Member
82—Lower Solid Rod
84—Winged Set Screw
86—Upper, Tubular Push Bar Handle Means
88—Bolt

DESCRIPTION OF THE PREFERRED EMBODIMENTS

Figure 1:
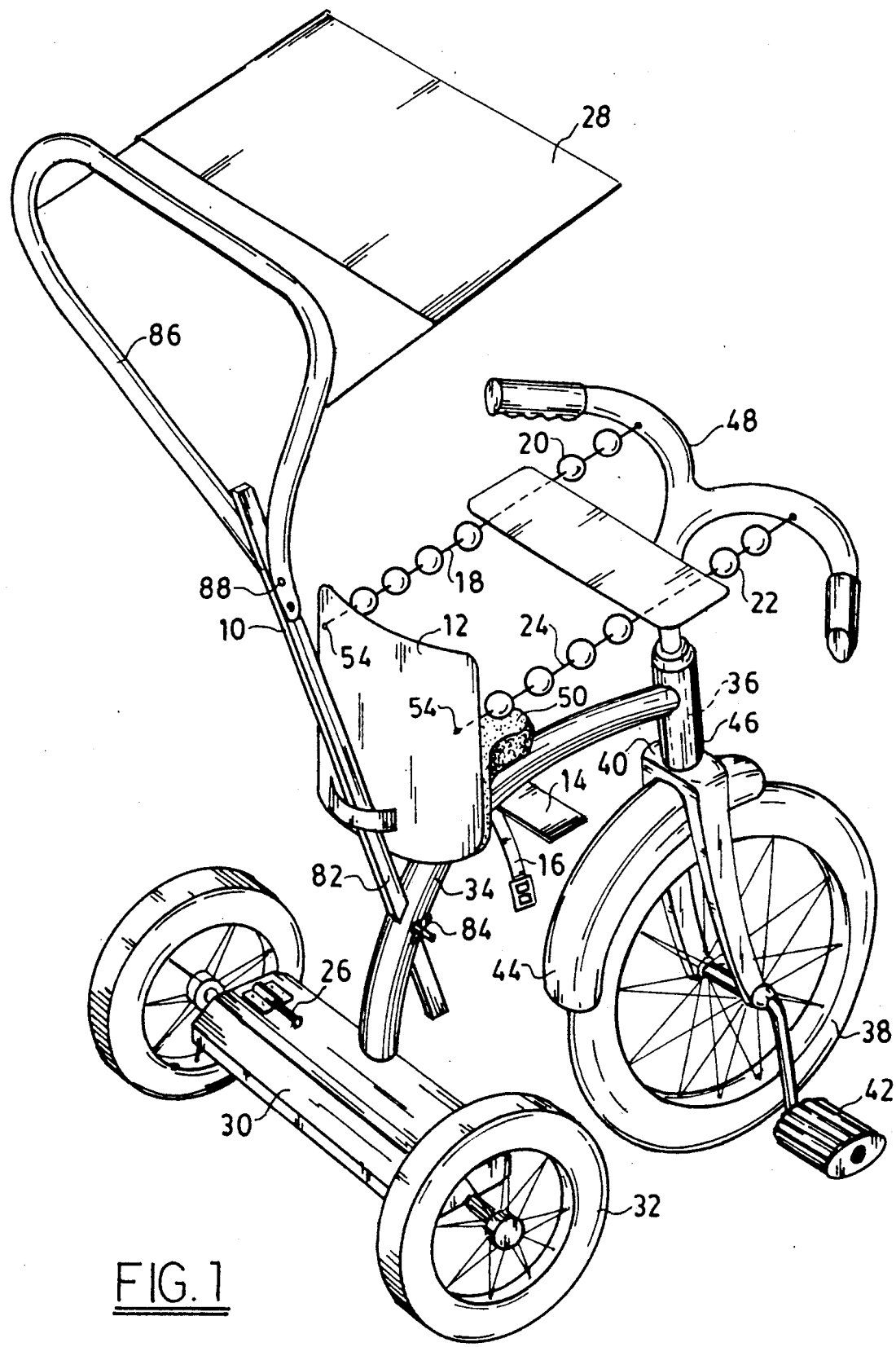
FIG. 1 shows a perspective view of the fully assembled stepwise convertible tricycle.

Referring to FIG. 1, a novel stepwise convertible tricycle toy is illustrated comprising: a detachable, adjustable push and guide handle means 10 which can be of many various designs some of which, by way of illustration, but not limitation, are shown in FIGS. 2A through 2E, any of which can be made of tubular, square or other extruded material, such as steel, and which handle is attached to a tricycle by any of commonly used coupling means, such as clamps, bolts, etc., and which push and guide handle is used by a person in an upright position, pushing and guiding the stepwise convertible tricycle toy upon any suitable surface. To the handle means 10, may be attached a removable sun-shade means 28.

A detachable movable head support means 11 and a detachable back support means 12, both of which may be metal or plastic with optional padding and are of configurations which provide suitable support means for the back and the head of the infant occupant, and which may be attached by various means, such as clamps, bolts, screws, etc., to the above described push and guide handle means 10, and the back support means is further attached to a right 24 and a left 18 restrainer means. The back support means is also attached to a saddle seat means 50. The back and head support means may also be combined into one unit.

A detachable safety seat belt means 16 can be made of fabric, plastic, etc., and comprise one, two, or more parts which, will interlock and secure the occupant in the saddle seat 50 and the back support means 12. The said seat belt or parts thereof (one or teo parts), may surround occupant's waist line, and another part may be threaded around a waist line belt and act as a crotch belt.

Detachable left 18 and right 24 restrainer means can be attached to the steering handlebar 48 and to the back support means 12 by any suitable bolt or other attachment means 54.

Both side restrainer means accommodate the spacer means 20 which may be made of plastic, rubber or wood and can be easily individually moved back and forth on the side restrainers, so as to leave suitable gaps which will allow attachment of the detachable front restrainer means 22 made of wood, metal or plastic with optional padding. Thus, by the movement of the spacer means, as the child grows, the front restrainer can always be protecting the child as snugly as desired, as further illustrated in FIGS. 3A and 3B, which show the initial infant snug position 3A and the position after the child has grown substantially as, 3B.

The basic tricycle consists of a transverse rear axle means 30 comprising an axle attached to a stepplate with left and right rotatable wheels 32 mounted on the axles which allow the tricycle toy to roll along a suitable surface and prevent the tricycle from tipping over sideways. To the rear axle attached is a child proof parking brake means 26, comprising a sleeve within which a rod can be moved in and out of the spokes of the rear wheel. A longitudinal main frame 34 is attached to the rear axle means 30, and its front end is equipped with a vertically attached cylindrical steering sleeve 46. Along the length of the longitudinal main frame 34 the push and guide handle 10, a saddle seat 50 and a foot rest 14 may be attached. Into the steering sleeve 46 inserted is a cylindrical upper portion or stem 36 of a front fork 40 containing a pedal equipped rotatable front wheel 38 capable of propelling or stopping the tricycle toy when the rider rotates the pedals 42. A fender 44, may be attached to the front fork 40 above the front wheel 38.

Into the upper end of the front fork stem 36 inserted is a handlebar 48 which is the steering and guidance mechanism capable of controlling the direction of the travel of the tricycle toy by the rider thereof, after the side restraining means 18 and 24 have been removed.

Referring to FIGS. 2A–2E, illustrated are some of the preferable push and guide handle configurations.

Figure 2A:
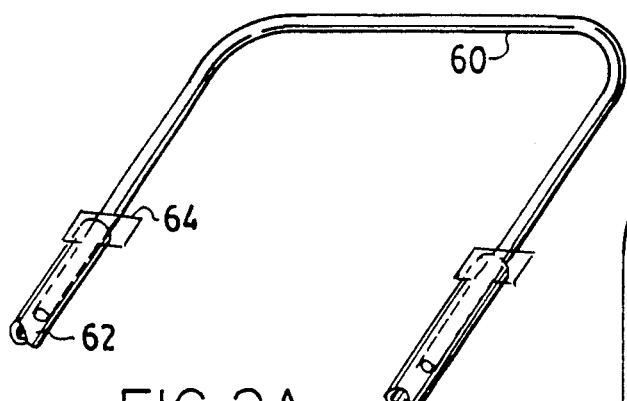
FIG. 2A through 2E show a variety of handles which may be used in different embodiments of this invention.

In FIG. 2A is shown the telescoping inverted "U" handle comprising the smaller diameter upper "U" shaped handle grasp part 60 which can be tubular, and which retracts into two larger diameter upward extending tubes 62 from their attachment points on the transverse rear axle means 30 to achieve the desired position for the convenience of the person in an upright position pushing and guiding the stepwise convertible tricycle toy, or retractable to its limit to reduce the length of the push and guide handle 60 and 62 to its minimum for storage in a limited space, such as the trunk of a car, and securable by any of the commonly used catches 64.

Figure 2B:
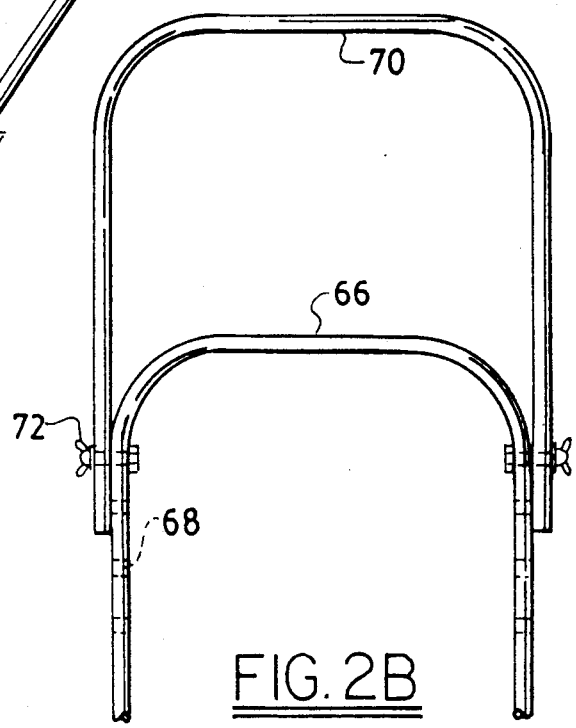

In FIG. 2B is shown a double inverted "U" adjustable handle means comprising the lower inverted "U" shaped member 66 attached to the rear axle means 30 and to the saddle seat means 50 and equipped with suitably spaced multiple holes 68 which allow selected height attachment of the upper inverted "U" shaped member 70 with suitably shaped lower portions of the inverted "U" which provide a secure attachment by means of wing nuts 72. The upper inverted "U" handle 70 is also completely foldable for storage. To the upper inverted "U" handle an upper head restraint 11 is movable attached, as shown by 11.

Figure 2C:
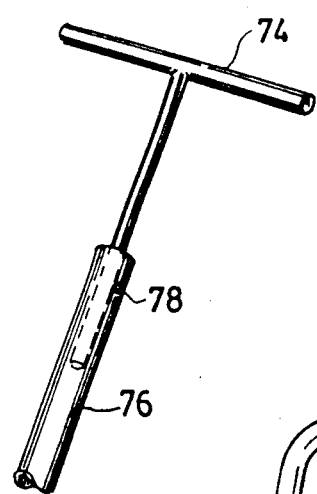

In FIG. 2C is shown the single telescoping adjustable "T" shaped push and guide handle means comprising a "T" shaped upper grasp 74 and a larger diameter lower tube member 76 attached by a lower end clamp 58 to the longitudinal main frame 34, and which may also be attached to the back support means 12, and equipped with suitably spaced holes in the smaller diameter upper tube to allow a ball bearing or other type of catch mechanism 78 to secure the upper to the lower part of the handle to allow adjustability for grasping by a person walking in an upright position behind the stepwise convertible tricycle toy, and also to allow the upper handle to fully slide into the lower handle for storage and transportation.

Figure 2D:
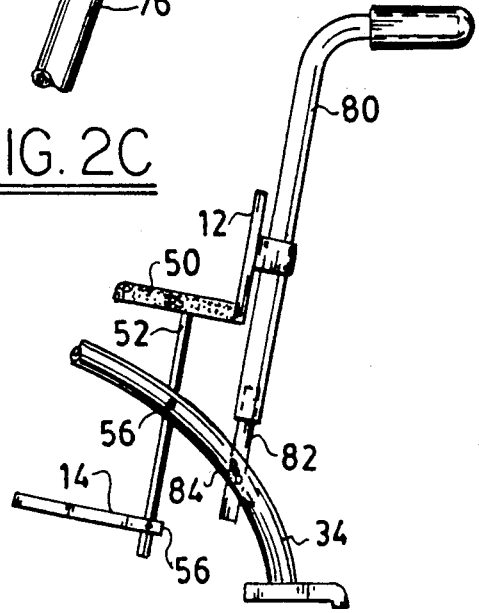

In FIG. 2D is shown a single adjustable inverted "L" shaped push and guide handle means comprising a tubular upper inverted "L" shaped handle member 80 which may be secured to the back support means 12, and a lower rod 81, which may include a plurality of bores 83, and which adjustably protrudes through the longitudinal main frame 34 and can be secured at any length position by a winged set screw 84 to allow adjustability for grasping by a person walking in an upright position behind the stepwise convertible tricycle toy, and also to allow the handle means to be removed for storage and transportation.

A detachable foot rest means 14 can be made of steel or plastic in a variety of shapes and sizes, and can be adjustably or non-adjustably attached by bolts, screws, clamps, set screws, etc., to a longitudinal main frame 34, or to an adjustable saddle support means 52, as illustrated in FIG. 2D.

A saddle seat 50 may be metal, plastic, etc., and may be mounted on any adjustable support means, such as a saddle seat support post 52 which is inserted through one of the two or more openings in the longitudinal main frame 34, making it adjustable longitudinally, and adjustable up and down by means of a set screw 56. Said saddle or similar support post 52 may be further protruding below the longitudinal main frame 34 and allowing for one embodiment of the adjustable mounting of the foot rest means 14 by another set screw 56, as illustrated in FIG. 2D.

Figure 2E:
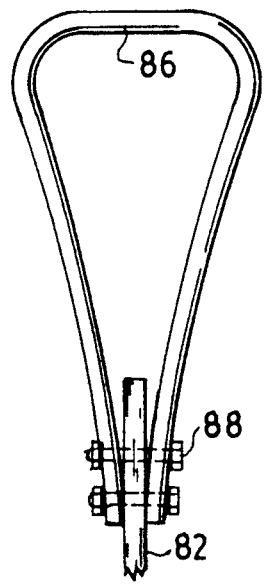

In FIG. 2E is shown a tubular push bar handle 86 being wide at the upper horizontal portion, which is attached by one or more bolts 88 to a lower, solid rod 82 which may include a plurality of bores 83, and which adjustably protrudes through the longitudinal main frame 34 as shown in FIG. 1, and can be secured at any length position by a winged set screw 84, to allow adjustability for grasping by a person walking in an upright position behind the stepwise convertible tricycle toy, and also to allow the handle means to be removed for storage and transportation.

Figure 3A:
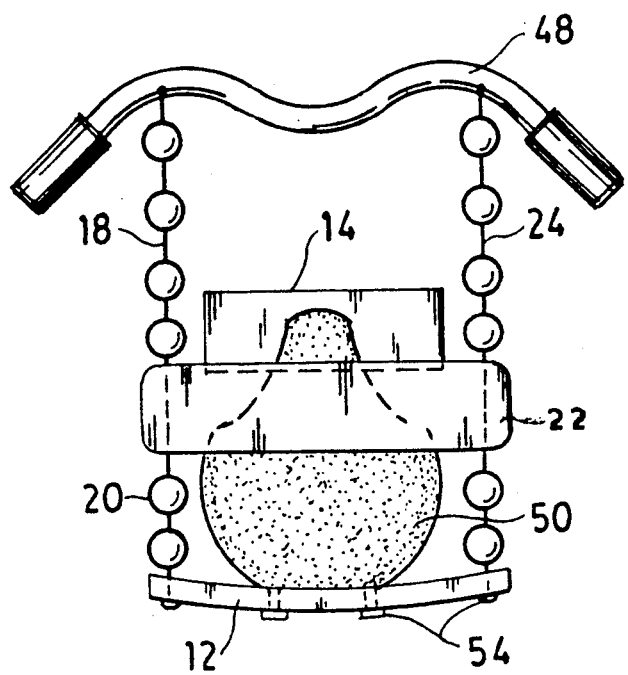
FIG. 3A and 3B show the side and front restrainers and the spacer balls which allow adjustment of the front restrainer.
Figure 3B:
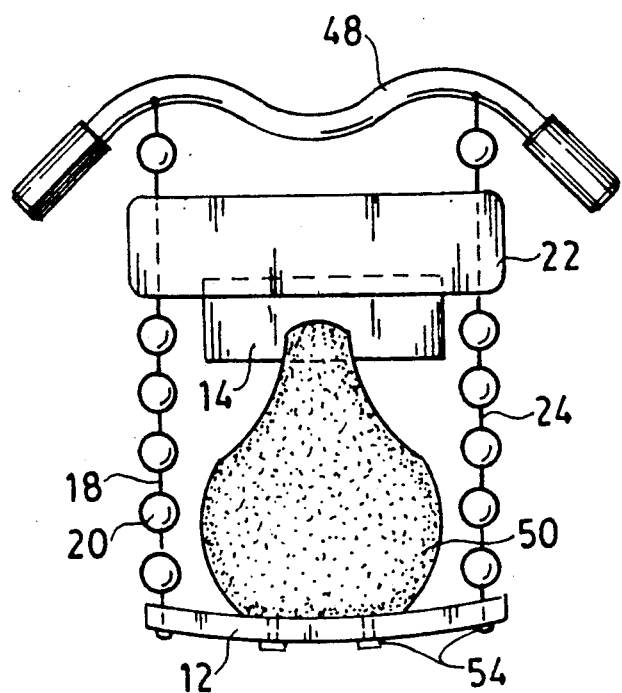

FIGS. 3A and 3B have been described above.

OPERATION OF THE STEPWISE CONVERTIBLE TRICYCLE TOY

The stepwise conversion process commences upon opening of the shipping container and completely assembling the toy vehicle. The fully assembled toy vehicle can be used to propel a baby as soon as the baby can hold his or her head upright.

As the baby develops, both physically and mentally, the following steps are taken:

(1) As the baby grows, move the front restrainer toward the handlebars.

(2) Move the saddle and/or the foot rest as baby's legs grow.

(3) Remove the front restrainer so baby starts holding the up and down adjustable handlebars while continuing use of the seat belt.

(4) Remove the foot rest and move the saddle when baby's feet reach the pedals (instep approximately 14" or 15"). Baby exercises by turning pedals, while a grown-up slowly guides.

(5) While the grown-up maintains full control by holding the handle allow the baby to propel the stepwise convertible tricycle by turning the pedals.

(6) Remove one side restrainer so baby can get used to keeping balance, while holding on to the handlebars, and while the steering is still fully under grown-ups control.

(7) Remove the second side restrainer so baby can steer while the grown-up still can control by slightly tipping backward so the front wheel is off the ground.

(8) Allow the baby to fully control the steering and propulsion while the grown-up just touches the handle.

(9) Train the baby to reverse the rotation of the pedals, thus stopping or reversing the direction of travel.

(10) Remove the handle and backrest as the baby gains full control and confidence months earlier than the baby would on an old fashioned tricycle.

(11) If any step results in an unsafe behavior by the baby, or if it makes the baby or the parent uncomfortable, it can be immediately reversed and repeated at a later stage of baby's development.

Although the invention has been described by reference to some embodiments, it is not intended that the novel stepwise convertible tricycle toy be limited thereby, but that any and all modifications thereof are intended to be included, and falling within the broad scope and spirit of the foregoing disclosure, the following claims, and the appended drawings.

I claim:

1. A stepwise convertible tricycle toy comprising
   a. a longitudinal main frame having a front and rear end;
   b. a vertical cylindrical steering sleeve attached to said front end;
   c. a front fork having an upper end inserted in said steering sleeve and a lower end connected to a rotatable front wheel at the axis thereof;
   d. a pedal attached to said wheel at said axis;
   e. a handlebar attached to said upper end of said front fork;
   f. a saddle seat movably attached to said longitudinal main frame;
   g. a transverse rear axle means comprising an axle having two rotatable wheels mounted at each end of said axle;
   h. a stepplate mounted on said transverse axle means;
   i. a push and guide handle means for moving said tricycle;
   j. a back support means attached to said saddle seat and to said handle;
   k. said back support means comprising a lower back support attached to said saddle seat and an upper head restraint movably attached to said handle.

2. The invention as defined in claim 1, wherein said handle means comprises an inverted U-shaped handle consisting of a pair of lower larger diameter handle members and an upper smaller diameter inverted U-shaped portion having members telescopically engaging and retracting into said lower larger diameter handle members, said lower larger diameter members having catch means for releasably securing said handle in any one of a plurality of positions.

3. The invention as defined in claim 1, wherein said handle means comprises an inverted double-U-type push and guide handle means consisting of an upper U-shaped member and a catch means extending through holes extending through the diameter of both of said inverted double-U-type members which allow folding of said upper U-shaped member.

4. The invention as defined in claim 3, wherein said lower U-shaped member comprises a plurality of holes therein to provide for different heights of said upper members with respect to said lower member.

5. The invention as defined in claim 1, wherein said handle means comprises a larger diameter lower tube with a T-shaped smaller diameter upper handle member telescopically engaging and retracting into said lower tube, and a catch means connecting said upper T-shaped handled member and said lower tube providing telescopic adjustment of said upper T-shaped member with respect to said lower member.

6. The invention as defined in claim 1, wherein said handle means comprises an inverted L-shaped upper handle member consisting of a smaller diameter telescopically engaging and retracting into a larger diameter lower tube, and a catch means connecting said upper L-shaped handle member and said lower tube.

7. The invention as defined in claim 1, wherein said handle means comprises a lower rectangular rod connected into a rectangular hole in said frame and an upper L-shaped handled member having a rectangular hole connecting said rectangular rod at the upper end, and a catch means consisting of a winged set screw connecting said rectangular rod to said frame.

8. The invention as defined in claim 7, wherein said rectangular rod includes a plurality of bores to adjust the position of said rod with respect to said frame.

9. The invention as defined in claim 1, wherein said handle means comprises a tubular push bar handle being wide at an upper horizontal handle portion and connected to a lower rectangular rod connected into a rectangular hole in said frame, and a catch means consisting of a winged set screw connecting said rectangular rod to said frame.

10. The invention as defined in claim 10, wherein said rectangular rod includes a plurality of bores to adjust the position the position of said rod with respect to said frame.

11. The invention as defined in claim 1, further including a detachable sun shade means comprising a frame and a canopy stretched on said frame whereby an occupant may be protected from the sun.

12. The invention as defined in claim 1, further including a parking brake means comprising a sleeve mounted on said transverse axle means and a shaft telescoping in said sleeve, said shaft adapted to protrude into said wheel.

13. The invention as defined in claim 1, further including a detachable foot rest means attached to said longitudinal main frame whereby an occupant's feet will be protected from the rotatable pedals.

14. The invention as defined in claim 21, further including a detachable foot rest means attached to the lower part of the saddle seat support post.

15. The invention as defined in claim 1 further including left and right restrainer means attached to said handle bar and to said back support means for restraining an occupant.

16. The invention as defined in claim 15, further including a snap-on front restrainer mounted to said right and left restrainer means, whereby said restrainer is adapted to be selective positioned and repositioned relative to said back support means so that an occupant be safely held while seated in said saddle seat.

17. The invention as defined in claim 1, further including detachable spacer means mounted on said right and left restraining means.

18. The invention as defined in claim 1, wherein said spacer means comprises plastic, wood or rubber balls detachably mounted on said restrainer means.

19. The invention as defined in claim 1, further including a safety seat belt means attached to said saddle seat and said back support means.

* * * * *